US009884296B2

(12) United States Patent
Lin et al.

(10) Patent No.: US 9,884,296 B2
(45) Date of Patent: Feb. 6, 2018

(54) COMPOSITE MEMBRANE UTILIZED IN MEMBRANE DISTILLATION (71) Applicant: TAIWAN TEXTILE RESEARCH INSTITUTE, New Taipei (TW)

(72) Inventors: Po-Ju Lin, New Taipei (TW); Jun-Hong Chen, New Taipei (TW); Yu-Ling Li, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 200 days.

(21) Appl. No.: 14/583,860

(22) Filed: Dec. 29, 2014

(65) Prior Publication Data
US 2015/0321146 A1 Nov. 12, 2015

(30) Foreign Application Priority Data

May 9, 2014 (TW) .............................. 103116565 A (51) Int. Cl.
*B01D 39/00* (2006.01)
*B01D 39/14* (2006.01)
(Continued)

(52) U.S. Cl.
CPC ........... *B01D 69/12* (2013.01); *B01D 61/364* (2013.01); *B01D 69/02* (2013.01); *B01D 69/125* (2013.01);
(Continued)

(58) Field of Classification Search
CPC ............ B01D 2325/36; B01D 2323/02; B01D 61/364; B01D 69/12; B01D 71/08;
(Continued)

(56) References Cited

U.S. PATENT DOCUMENTS 3,846,404 A * 11/1974 Nichols .............. B01D 67/0009
106/170.26
4,828,705 A * 5/1989 Thakore ................. A61K 9/284
210/356
(Continued)

FOREIGN PATENT DOCUMENTS

CN 102631844 A 8/2012
CN 103285739 A 9/2013

OTHER PUBLICATIONS

Weight percent, Eden Francis, http://dl.clackamas.edu/ch105-04/weight.htm, 1998, 2003 Clackamas Community College, Hal Bende.*
Adsorption of Poly(Vinylalcohols) from Water to a hydrophobic Surface: Effects to molecular Weigt, Degree of Hydrolysis, Salt, and Temperature, Mikahail Koslov andThomas J. McCarthy, Polymer Science and Engeenering Department , University of Massachusetts, Jul. 24, 2004, pp. 9170-9176.*

*Primary Examiner* — Ana Fortuna
(74) *Attorney, Agent, or Firm* — McClure, Qualey & Rodack, LLP (57) ABSTRACT

A composite membrane includes a hydrophobic porous membrane and a high water content hydrogel layer disposed on the surface of the hydrophobic porous membrane facing the hot end. The surface active agents contained in the wastewater at the hot end are blocked by the high water content hydrogel layer, thus the problem of pore wetting of the hydrophobic porous membrane can be prevented. Therefore, the membrane distillation technique can be utilized for processing wastewater containing surface active agents.

3 Claims, 11 Drawing Sheets

(51) Int. Cl.
*B01D 29/00* (2006.01)
*B01D 15/00* (2006.01)
*B01D 69/12* (2006.01)
*B01D 61/36* (2006.01)
*B01D 71/08* (2006.01)
*B01D 71/40* (2006.01)
*B01D 69/02* (2006.01)
*B01D 71/26* (2006.01)
*B01D 71/32* (2006.01)
*B01D 71/36* (2006.01)
*B01D 71/38* (2006.01)
*B01D 71/48* (2006.01)
*B01D 71/52* (2006.01)

(52) U.S. Cl.
CPC ............. *B01D 71/08* (2013.01); *B01D 71/40* (2013.01); *B01D 71/26* (2013.01); *B01D 71/32* (2013.01); *B01D 71/36* (2013.01); *B01D 71/38* (2013.01); *B01D 71/48* (2013.01); *B01D 71/52* (2013.01); *B01D 2323/30* (2013.01); *B01D 2325/04* (2013.01); *B01D 2325/36* (2013.01)

(58) Field of Classification Search
CPC .......... B01D 2321/168; B01D 2323/30; B01D 2325/02; B01D 69/02; B01D 69/10
See application file for complete search history.

(56) References Cited

U.S. PATENT DOCUMENTS

| | | | | |
|---|---|---|---|---|
| 5,445,669 | A * | 8/1995 | Nakabayashi | B01D 53/228 423/226 |
| 5,880,216 | A * | 3/1999 | Tanihara | C08F 216/06 525/59 |
| 6,604,746 | B1 * | 8/2003 | Sato | A63C 10/04 24/68 SK |
| 6,855,743 | B1 * | 2/2005 | Gvozdic | C08J 3/075 264/41 |
| 2006/0292701 | A1 * | 12/2006 | Huang | C08B 37/0021 436/514 |
| 2009/0057224 | A1 * | 3/2009 | Huang | B01D 53/268 210/640 |
| 2009/0305024 | A1 * | 12/2009 | Gvozdic | C08J 3/075 428/304.4 |
| 2011/0120941 | A1 * | 5/2011 | Allen | B01D 65/08 210/500.35 |
| 2014/0069862 | A1 * | 3/2014 | Guo | B01D 67/002 210/500.29 |
| 2015/0321146 | A1 * | 11/2015 | Lin | B01D 61/364 210/500.28 |

\* cited by examiner

COMPOSITE MEMBRANE UTILIZED IN MEMBRANE DISTILLATION

RELATED APPLICATIONS

This application claims priority to Taiwanese Application Serial Number 103116565, filed May 9, 2014, which is herein incorporated by reference.

BACKGROUND

Field of Invention

The invention is related to a membrane for membrane distillation.

Description of Related Art

Since water leakage becomes a problem, membrane distillation technique is widely utilized in seawater desalination and water recycle fields. The principle of the membrane distillation technique is to separate a high temperature solution and a low temperature by a porous membrane with hydrophilic property, such that the moisture passes through the pores of the porous membrane from the high temperature side to the low temperature side because of the vapor pressure deficit, which is generated by the temperature gradient between the high temperature side and the low temperature side. Then the moisture is cooled and condensed at the low temperature side.

The membrane distillation technique can provides good property for cleaning water. Therefore, besides the seawater desalination, the membrane distillation technique is also utilized for processing wastewater. However, the waste water contains surface active agents, which may lower the surface tension thereby causing the porous membrane wetting. The membrane distillation function is ceased when the porous membrane is wet. Therefore, the membrane flux and the water quality is poor when the membrane distillation technique is utilized for processing wastewater.

The dyeing wastewater exhausted by the textile mill is a kind of industry wastewater with huge amount and high temperature, which is a good object of membrane distillation. However, the chemical components utilized in the dyeing process, such as the leveling agents, softening agents, or other organic agents with surface active characteristic, would make membrane pollution or pore wetting. Therefore, it is difficult to process the dyeing wastewater with the membrane distillation technique.

SUMMARY

The present invention provides a composite membrane which can membrane distilling wastewater containing surface agents.

In some embodiments, the composite membrane utilized in membrane distillation includes a hydrophobic porous membrane having a first surface and a second surface opposite to each other, wherein the first surface is corresponding to a hot side and the second surface is corresponding to a cold side, and a high water content hydrogel layer disposed at the first surface. The water content of the high water content hydrogel layer is greater than 30%, wherein the $$\text{water content} = \frac{W_s - W_d}{W_s} \times 100\%,$$

in which Ws represents a weight of the wet high water content hydrogel layer, and Wd represents the dry high water content hydrogel layer.

The surface active agents contained in the wastewater at the hot end are blocked by the high water content hydrogel layer, thus the problem of pore wetting of the hydrophobic porous membrane can be prevented. Therefore, the membrane distillation technique can be utilized for processing wastewater containing surface active agents.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
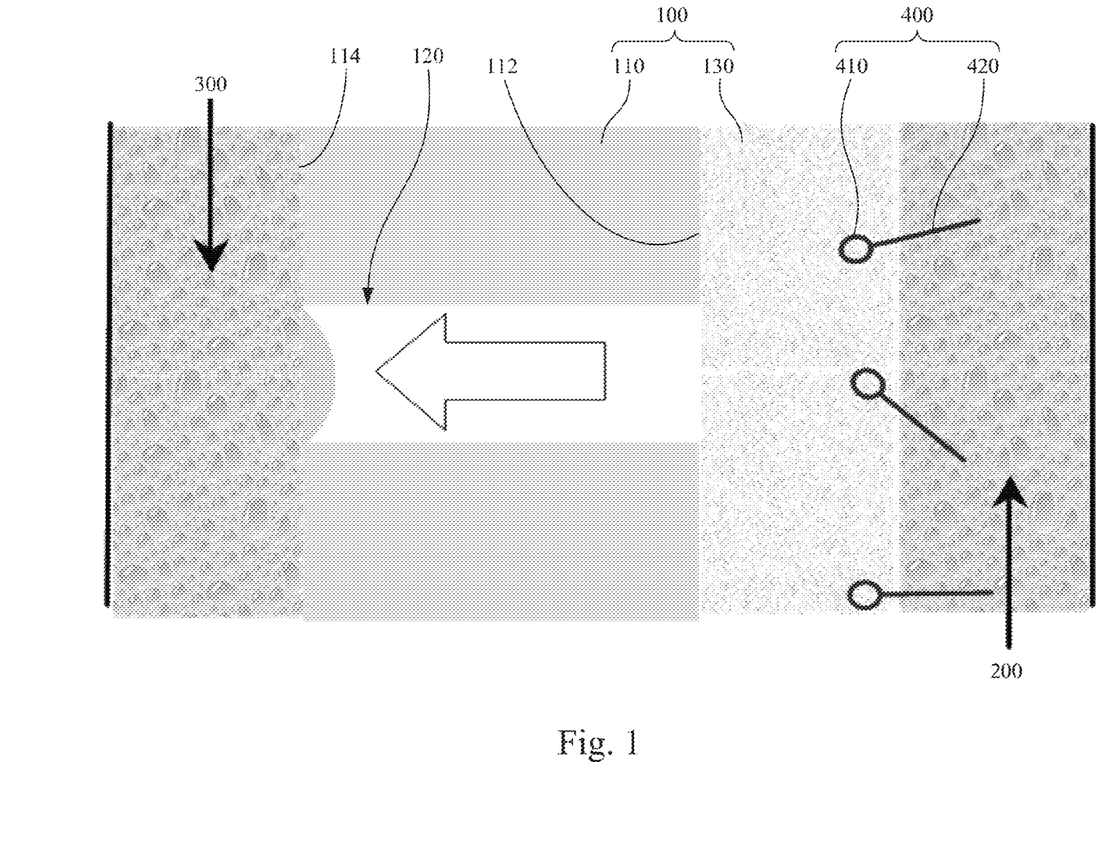
FIG. 1 is a cross-sectional view of an embodiment of a composite membrane while operation of the invention.

FIG. 1 is a cross-sectional view of an embodiment of a composite membrane while operation of the invention. The composite membrane 100 includes a hydrophobic porous membrane 110 and a high water content hydrogel layer 130. The hydrophobic porous membrane 110 has a first surface 112 and a second surface 114 opposite to each other. The first surface 112 is corresponding to a hot end 200, and the second surface 114 is corresponding to a cold end 300. The high water content hydrogel layer 130 is disposed at the first surface 112.

The hydrophobic porous membrane 110 has a plurality of pores 120. The pores 120 connecting the first surface 112 to the second surface 114. The hot end 200 is one of opposite ends of the composite membrane 100 having higher temperature. The hot end 200 contains wastewater or seawater with high temperature for being membrane distillated. The cold end 300 is one of opposite ends of the composite membrane 100 having lower temperature. The moisture (water of tiny volume in liquid state) of the hot end 200 passes through the high water content hydrogel layer 130, and then the moisture passes through the pores 120 of the hydrophobic porous membrane 110 to the cold end 300, and the moisture is condensed and becomes water.

The wastewater at the hot end 200 may contains surface active agents 400 having surface active characteristic, such as organic agents or surfactants. In order to prevent the pores 120 of the hydrophobic porous membrane 110 from being wetted by the wastewater containing the surface active agents 400, the water content of the high water content hydrogel layer 130 is greater than 30%, such that the surface active agents 400 in the high temperature waste water are blocked by the high water content hydrogel layer 130. Since the surface active agents 400 are blocked by the high water content hydrogel layer 130, the active agents 400 would not be carried with the moisture. Therefore, the pores 120 would not be wetting. The water content herein is defined as:

$$\text{water content} = \frac{W_s - W_d}{W_s} \times 100\%,$$

in which Ws represents a weight of the wet high water content hydrogel layer 130, and Wd represents the dry high water content hydrogel layer 130. The steps for getting the weight of the wet high water content hydrogel layer 130 include putting the high water content hydrogel layer 130 in the water for a while, moving the high water content hydrogel layer out of water and waiting for a while until the water adhered on the surface of the high water content hydrogel layer 130 is dropped, and then measuring the weight of the high water content hydrogel layer 130. The steps for getting the weight of the dry high water content hydrogel layer 130 include drying the high water content hydrogel layer 130 for a while, and then measuring the weight of the high water content hydrogel layer 130.

The high water content hydrogel layer 130 is utilized for blocking the surface active agents 400 in the high temperature wastewater, such that the surface active agents 400 do not enter the pores 120, and the situation of pore wetting due the existence of the surface active agents 400 can be prevented. More particularly, each of the surface active agents 400 has a hydrophilic end 410 and a hydrophobic end 420. Because the high water content hydrogel layer 130 has high water content, for example, at least greater than 30%, the hydrophilic ends 410 of the surface active agents 400 are captured and kept in the high water content hydrogel layer 130. Therefore, the surface active agents 400 stay at the portion of the high water content hydrogel layer 130 near the hot end 200. As a result, the problem of the high temperature wastewater containing surface active agents 400 is difficult for membrane distillation can be overcome.

The hydrophobic porous membrane 110 is made of polytetrafluoroethylene (PTFE), polypropene (PP), polyvinylidene fluoride (PVDF), polyolefin, or the combinations thereof. In some embodiments, the hydrophobic porous membrane 110 can be a polytetrafluoroethylene film, a polypropene stretch film, a polypropene thermal phase change film, a polyvinylidene fluoride film, or other hydrophobic films.

The material of the high water content hydrogel layer 130 includes polysaccharide, protein, polyvinyl alcohol (PVA), polyethylene glycol (PEG), polyethylene oxide (PEO), acrylic series, polyurethane, cellulose, chitin, alginic acid, the modifications thereof, the copolymers thereof, or the combinations thereof. The polysaccharide of the high water content hydrogel layer 130 can be curdlen, agarose or agar. The monomer of the acrylic series of the high water content hydrogel layer 130 can be 2-hydroxyethyl acrylate (HEA), hydroxyethyl methacrylate (HEMA), hydroxyethoxyethyl methacrylate (HEEMA), hydroxydiethoxyethyl methacrylate (HDEEMA), methoxyethyl methacrylate (MEMA), methoxyethoxyethyl methacrylate (MEEMA), methoxydiethoxyethyl methacrylate (MDMEEMA), ethylene glycol dimethacrylate (EGDMA), N-vinyl-2-pyrrolidone (NVP), N-isopropyl AAm (NIPAAm), acrylic acid (AA), methyl acrylate acid (MAA), N-(2-hydroxypropyl) methacrylamide (HPMA), ethylene glycol (EG), PEG acrylate (PEGA), PEG methacrylate (PEGMA), PEG diacrylate (PEGDA), PEG dimethacrylate (PEGDMA), β-carboxyethyl acrylate, 2-(dimethylamino)ethyl acrylate, ethylene glycol methyl ether acrylate, 2-ethoxyethyl acrylate, the modifications thereof, the copolymers thereof, or the combinations thereof.

The water content of high water content hydrogel layer 130 is at least greater than 30%. In some embodiments, the water content of the high water content hydrogel layer 130 is in a range from about 50% to about 90%. For example, the water content of the high water content hydrogel layer 130 can be 50%, 55%, 60%, 65%, 70%, 75%, 80%, 85%, or 90%. The high water content hydrogel layer 130 can be a porous material or a non-porous material. The high water content hydrogel layer 130 can be a physical crosslinking material or a chemical crosslinking material.

The mesh size of the high water content hydrogel layer 130 is less than 10 μm. In some embodiments, the mesh size of the high water content hydrogel layer 130 is in a range from about 0.001 μm to about 10 μm, such that the water mass cannot pass through the high water content hydrogel layer 130, and cannot pass through the pores 120 of the hydrophobic porous membrane 110 directly.

The influence of the surface active agents 400 to the membrane distillation can refer to FIG. 2 to FIG. 5. In FIG. 2 to FIG. 5, the temperature of the water at the cold end is about 21° C., the temperature of the wastewater at the hot end is about 60° C., the flow rate of the wastewater at the hot end is about 2 L/min, the flow rate of the water at the cold end is about 2 L/min, the electrolyte added into the wastewater at the hot end is NaCl, and the initial conductivity of the wastewater is 1400 μS/cm. In FIG. 2 to FIG. 5, the hollow points represent membrane flux (corresponding to the ordinate at the left hand side), the solid points represent conductivity (corresponding to the ordinate at the right hand side), and the abscissa represents operation time.

Figure 2:
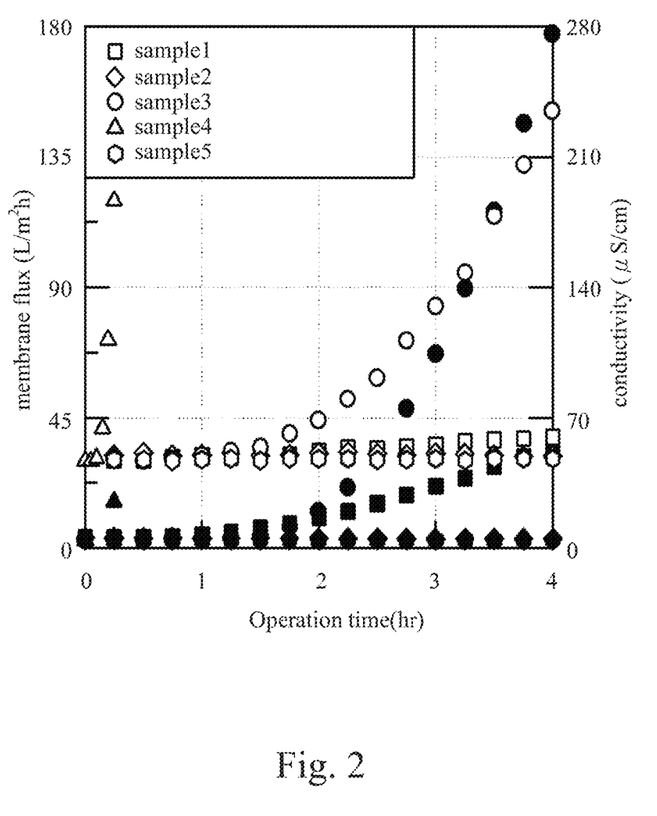
FIG. 2 to FIG. 5 show the influence of the surface active agents to the membrane distillation.

FIG. 2 is an experiment result of a membrane distillation using conventional porous membrane without a high water content hydrogel layer, in which the porous membrane is a PTFE film with a thickness of 20 μm and a pore size of 0.2 μm, Sample 1 is a wastewater containing dyeing for polyester textile, Sample 2 is a wastewater containing SDS, Sample 3 is a wastewater containing Tween 20, Sample 4 is a wastewater containing Tween 85, and Sample 5 is a wastewater containing dyeing for nylon textile.

As the result shown in FIG. 2, when the wastewater containing surface active agents is processed by the conventional membrane distillation technique, the pores in the membrane are wetting easily (Sample 3 and Sample 4), such that the membrane distillation is ceased since the membrane is wetting.

Figure 3:
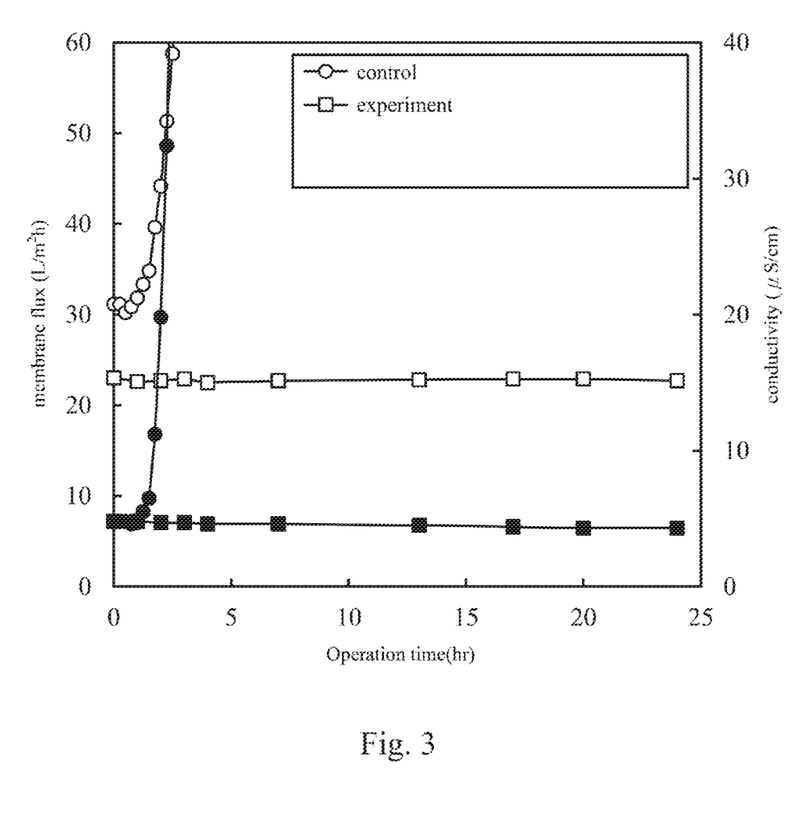
Figure 4:
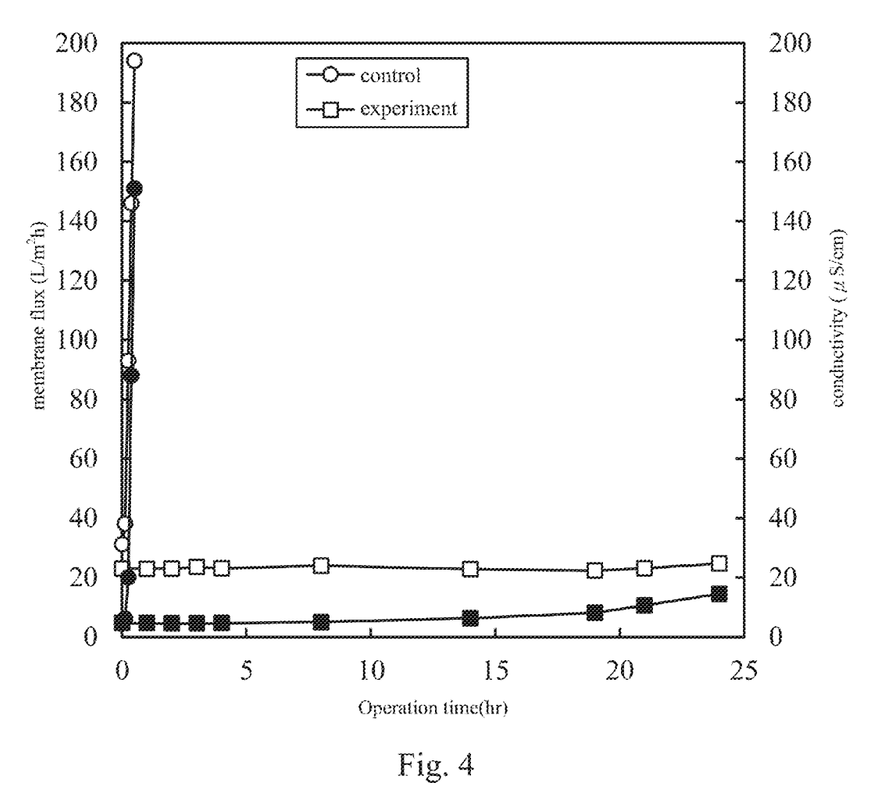

Reference is made to FIG. 3 and FIG. 4, in which the control is the membrane distillation result of using a conventional membrane without a high water content hydrogel layer, and the experiment is the membrane distillation result of using the composite membrane with the high water content hydrogel layer.

In FIG. 3, the porous membrane of the control is a PTFE film with a thickness of 20 μm and a pore size of 0.2 μm. The composite membrane of the experiment includes the hydrophobic porous membrane and the high water content hydrogel layer, in which the hydrophobic porous membrane is a PTFE film with a thickness of 20 μm and a pore size of 0.2 μm, and the high water content hydrogel layer is an agarose layer of 6 wt % with a mesh size of 192 nm, a water content of 94%, and a thickness of 200 μm. The wastewater at the hot end of the control and the experiment are added with Tween 20, and the concentration thereof is 10 mg/L. According to the result shown in FIG. 3, after a period of operation time, the membrane flux and the conductivity at the cold end of the control are changed obviously since the membrane flux and the conductivity at the cold end of the experiment are stable.

In FIG. 4, the porous membrane of the control is a PTFE film with a thickness of 20 μm and a pore size of 0.2 μm. The composite membrane of the experiment includes the hydrophobic porous membrane and the high water content hydrogel layer, in which the hydrophobic porous membrane is a PTFE film with a thickness of 20 μm and a pore size of 0.2 μm, and the high water content hydrogel layer is an agarose layer of 6 wt % with a mesh size of 192 nm, a water content of 94%, and a thickness of 200 μm. The wastewater at the hot end of the control and the experiment are added with Tween 85, and the concentration thereof is 10 mg/L. According to the result shown in FIG. 4, after a period of operation time, the membrane flux and the conductivity at the cold end of the control are changed obviously since the membrane flux and the conductivity at the cold end of the experiment are stable.

Figure 5:
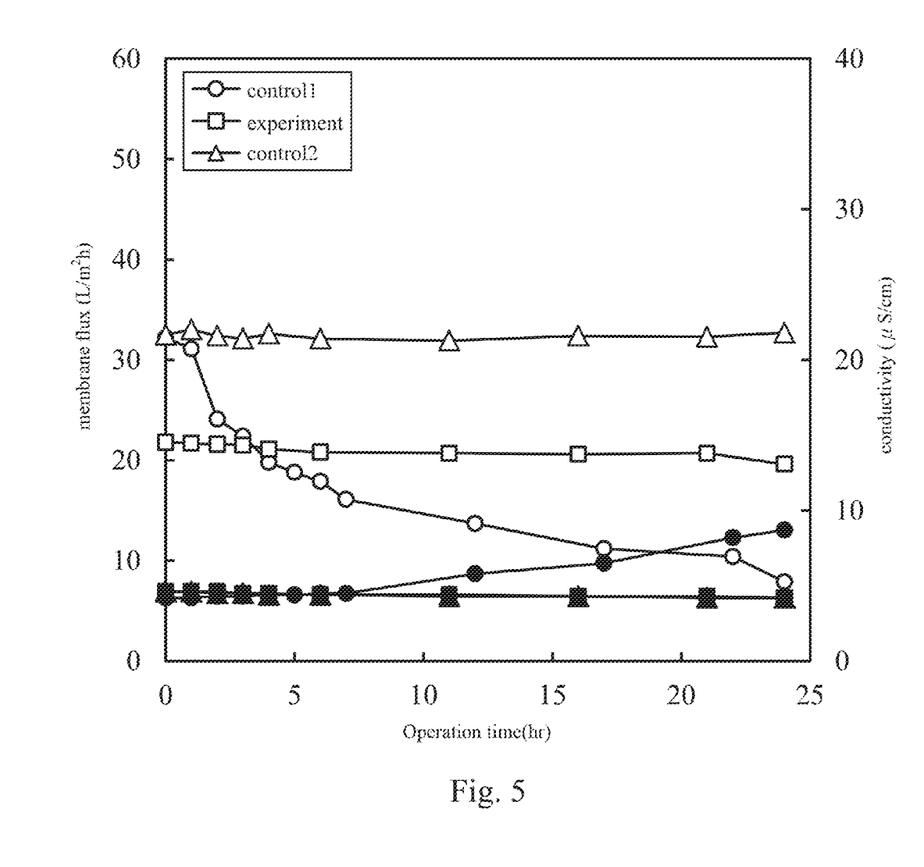

In FIG. 5, the porous membrane of the control is a PTFE film with a thickness of 20 μm and a pore size of 0.2 μm. The composite membrane of the experiment includes the hydrophobic porous membrane and the high water content hydrogel layer, in which the hydrophobic porous membrane is a PTFE film with a thickness of 20 μm and a pore size of 0.2 μm, and the high water content hydrogel layer is an agarose layer of 6 wt % with a mesh size of 192 nm, a water content of 94%, and a thickness of 200 μm. The wastewater at the hot end of the control 1 and the experiment is the wastewater exhausted by the textile mill having an initial conductivity of the wastewater of 975 μS/cm., and the wastewater at the hot end of the control 2 is the hot water added with NaCl having an initial conductivity of the wastewater of 1400 μS/cm., which can be regarded as hot water without surface active agents. According to the result shown in FIG. 5, after a period of operation time, the membrane flux and the conductivity of the control 1 at the cold end are changed obviously since the membrane flux and the conductivity at the cold end of the experiment and the control 2 are stable.

Figure 6:
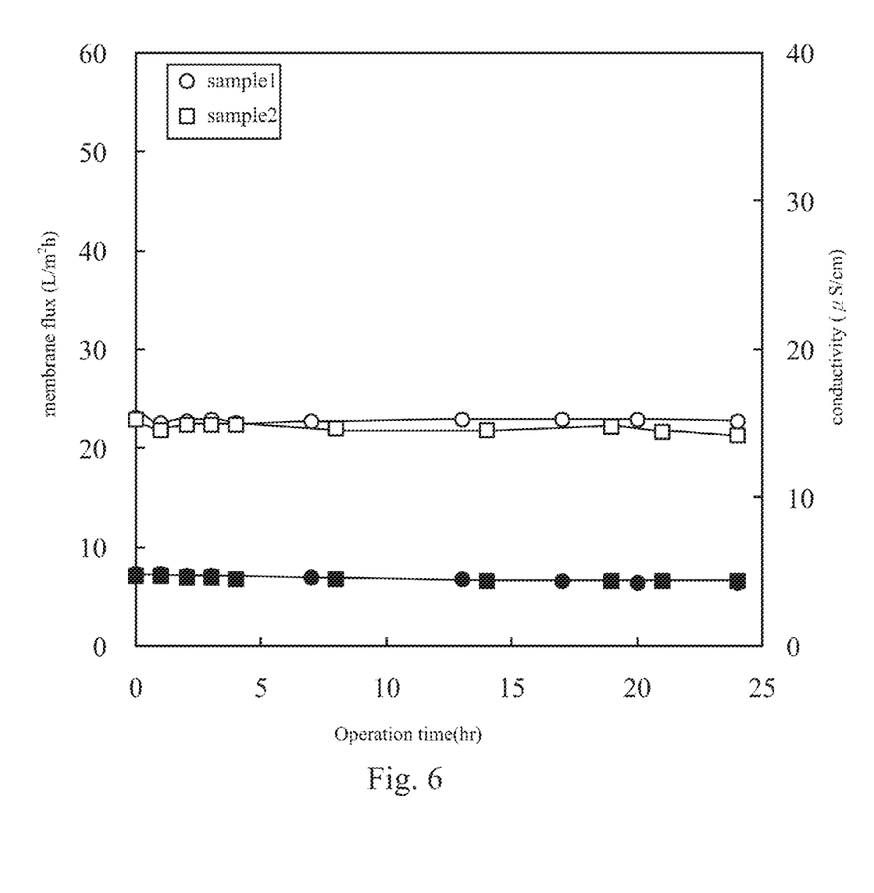
FIG. 6 and FIG. 7 are the membrane distillation results using the composite membrane for processing different types of wastewater.
Figure 7:
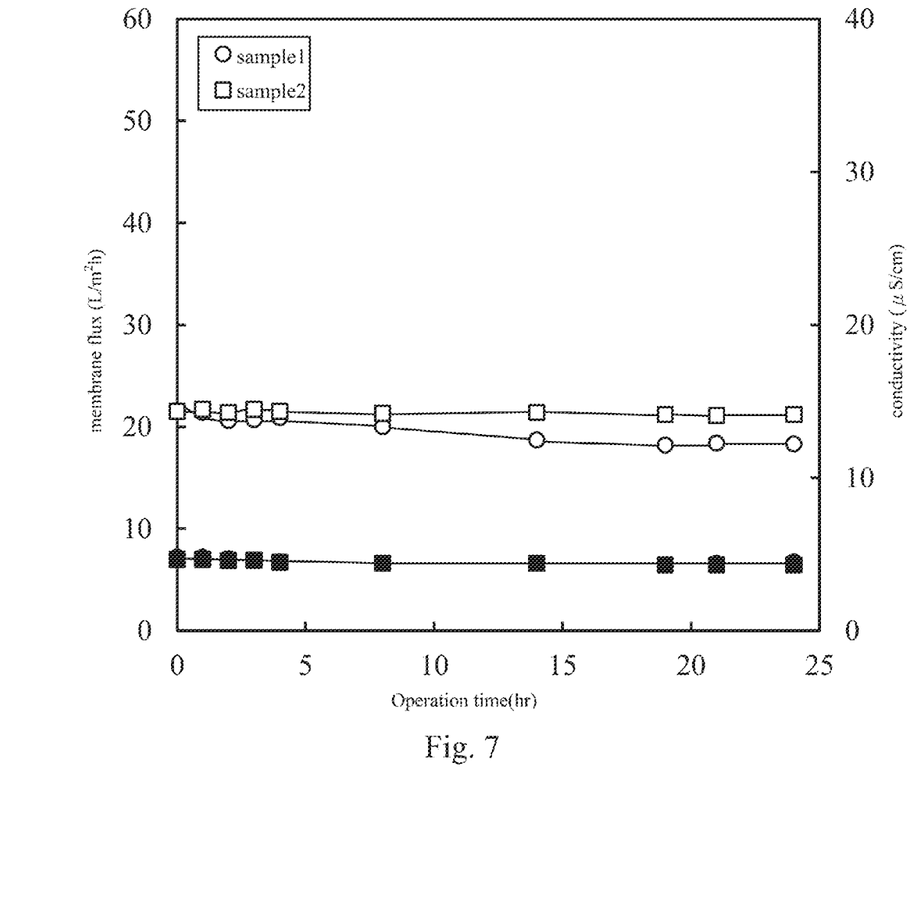

Reference is made to FIG. 6 and FIG. 7. FIG. 6 and FIG. 7 are the membrane distillation results using the composite membrane for processing different types of wastewater. In FIG. 6, the temperature of the water at the cold end is about 21° C., the temperature of the wastewater at the hot end is about 60° C., the flow rate of the wastewater at the hot end is about 2 L/min, the flow rate of the water at the cold end is about 2 L/min, the electrolyte added into the wastewater at the hot end is NaCl, and the initial conductivity of the wastewater is 1400 μS/cm. The composite membrane includes the hydrophobic porous membrane and the high water content hydrogel layer, in which the hydrophobic porous membrane is a PTFE film with a thickness of 20 μm and a pore size of 0.2 μm, and the high water content hydrogel layer is an agarose layer of 6 wt % with a mesh size of 192 nm, a water content of 94%, and a thickness of 200 μm. In FIG. 6, the hollow points represent membrane flux (corresponding to the ordinate at the left hand side), the solid points represent conductivity (corresponding to the ordinate at the right hand side), and the abscissa represents operation time. In FIG. 6, the wastewater at the hot end of the Sample 1 is added with Tween 20 of concentration of 10 mg/L, the wastewater at the hot end of Sample 2 is added with Tween 20 of concentration of 100 mg/L.

According to the membrane distillation result, after a long-term membrane distillation, the membrane flux and the conductivity of the Sample 1 and Sample 2 at the cold end remain stable. Therefore, the composite membrane of the present disclosure can be utilized for processing wastewater containing Tween 20.

In FIG. 7, the temperature of the water at the cold end is about 21° C., the temperature of the wastewater at the hot end is about 60° C., the flow rate of the wastewater at the hot end is about 2 L/min, the flow rate of the water at the cold end is about 2 L/min, the electrolyte added into the wastewater at the hot end is NaCl, and the initial conductivity of the wastewater is 1400 μS/cm. The composite membrane includes the hydrophobic porous membrane and the high water content hydrogel layer, in which the hydrophobic porous membrane is a PTFE film with a thickness of 20 μm and a pore size of 0.2 μm, and the high water content hydrogel layer is an agarose layer of 6 wt % with a mesh size of 192 nm, a water content of 94%, and a thickness of 200 μm. In FIG. 7, the hollow points represent membrane flux (corresponding to the ordinate at the left hand side), the solid points represent conductivity (corresponding to the ordinate at the right hand side), and the abscissa represents operation time. In FIG. 7, the wastewater at the hot end of the Sample 1 is added with SDS of concentration of 500 mg/L, the wastewater at the hot end of Sample 2 is added with SDS of concentration of 2000 mg/L.

Figure 8:
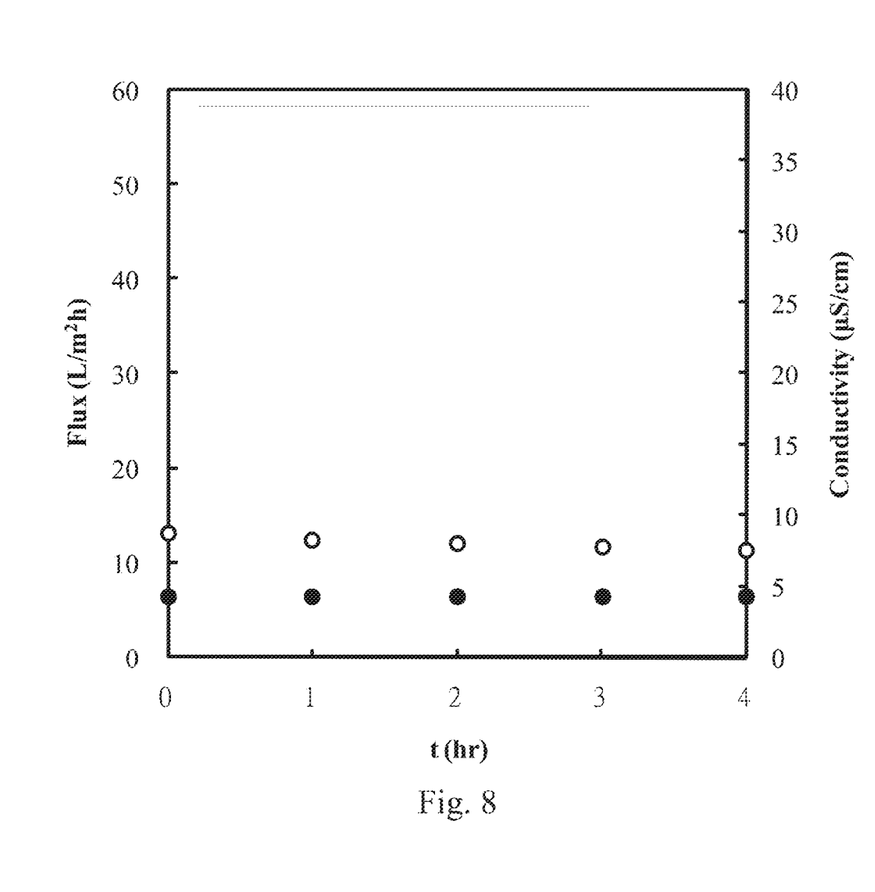
FIG. 8 to FIG. 11 are the membrane distillation results using different composite membranes of the invention.

Reference is made to FIG. 8 to FIG. 11, which are the membrane distillation results using different composite membranes of the invention. In FIG. 8, the hollow points represent membrane flux (corresponding to the ordinate at the left hand side), the solid points represent conductivity (corresponding to the ordinate at the right hand side). The wastewater at the hot end is added with Tween 20, and the concentration thereof is 300 mg/L. The temperature of the water at the cold end is about 21° C., the temperature of the wastewater at the hot end is about 60° C., the flow rate of the wastewater at the hot end is about 6 L/min, and the flow rate of the water at the cold end is about 1 L/min. The electrolyte added into the wastewater at the hot end is NaCl, and the initial conductivity of the wastewater is 1400 μS/cm. The composite membrane includes the hydrophobic porous membrane and the high water content hydrogel layer, in which the hydrophobic porous membrane is a PTFE film with a thickness of 20 μm and a pore size of 0.2 μm, and the high water content hydrogel layer is a curdlen layer of 4 wt % with a mesh size of 237 nm, a water content of 96%, and a thickness of 200 μm. According to the result shown in FIG. 8, after a period of operation time, the membrane flux and the conductivity at the cold end remain stable. Therefore, the composite membrane with the high water content hydrogel layer made of curdlen can be utilized for processing the wastewater containing Tween 20.

Figure 9:
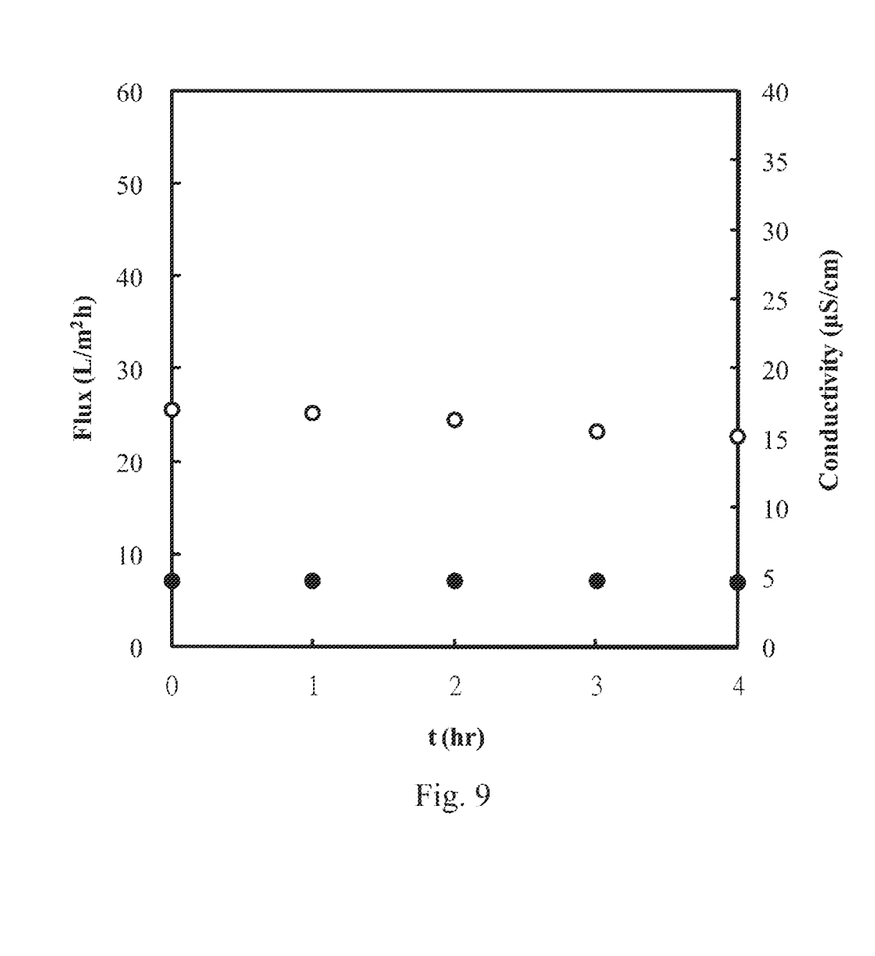

In FIG. 9, the hollow points represent membrane flux (corresponding to the ordinate at the left hand side), the solid points represent conductivity (corresponding to the ordinate at the right hand side). The wastewater at the hot end is added with Tween 20, and the concentration thereof is 300 mg/L. The temperature of the water at the cold end is about 21° C., the temperature of the wastewater at the hot end is about 60° C., the flow rate of the wastewater at the hot end is about 6 L/min, and the flow rate of the water at the cold end is about 1 L/min. The electrolyte added into the wastewater at the hot end is NaCl, and the initial conductivity of the wastewater is 1400 μS/cm. The composite membrane includes the hydrophobic porous membrane and the high water content hydrogel layer, in which the hydrophobic porous membrane is a PTFE film with a thickness of 20 μm and a pore size of 0.2 μm, and the high water content hydrogel layer is a PVA layer of 10 wt % with a mesh size of 147 nm, a water content of 75%, and a thickness of 50 μm. According to the result shown in FIG. 9, after a period of operation time, the membrane flux and the conductivity at the cold end remain stable. Therefore, the composite membrane with the high water content hydrogel layer made of PVA can be utilized for processing the wastewater containing Tween 20.

Figure 10:
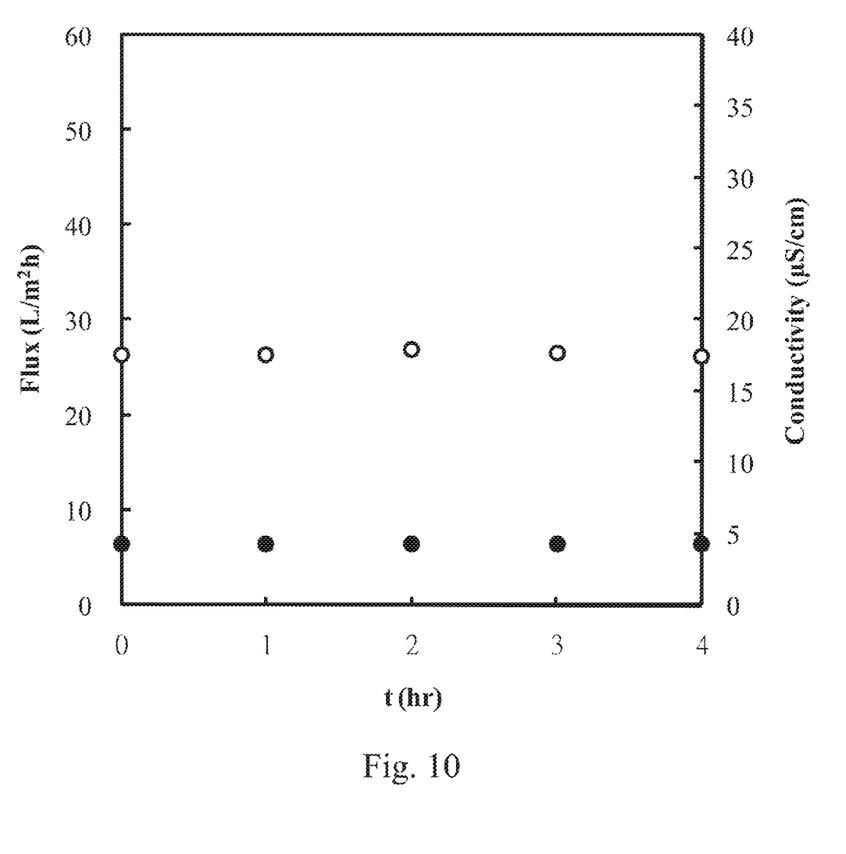

In FIG. 10, the hollow points represent membrane flux (corresponding to the ordinate at the left hand side), the solid points represent conductivity (corresponding to the ordinate at the right hand side). The wastewater at the hot end is added with Tween 20, and the concentration thereof is 300 mg/L. The temperature of the water at the cold end is about 21° C., the temperature of the wastewater at the hot end is about 60° C., the flow rate of the wastewater at the hot end is about 6 L/min, and the flow rate of the water at the cold end is about 1 L/min. The electrolyte added into the wastewater at the hot end is NaCl, and the initial conductivity of the wastewater is 1400 μS/cm. The composite membrane includes the hydrophobic porous membrane and the high water content hydrogel layer, in which the hydrophobic porous membrane is a PTFE film with a thickness of 20 μm and a pore size of 0.2 μm, and the high water content hydrogel layer is a 10 wt % PVA and 1% PEG layer with a mesh size of 140 nm, a water content of 75%, and a thickness of 50 μm. According to the result shown in FIG. 10, after a period of operation time, the membrane flux and the conductivity at the cold end remain stable. Therefore, the composite membrane with the high water content hydrogel layer made of PVA and PEG can be utilized for processing the wastewater containing Tween 20.

Figure 11:
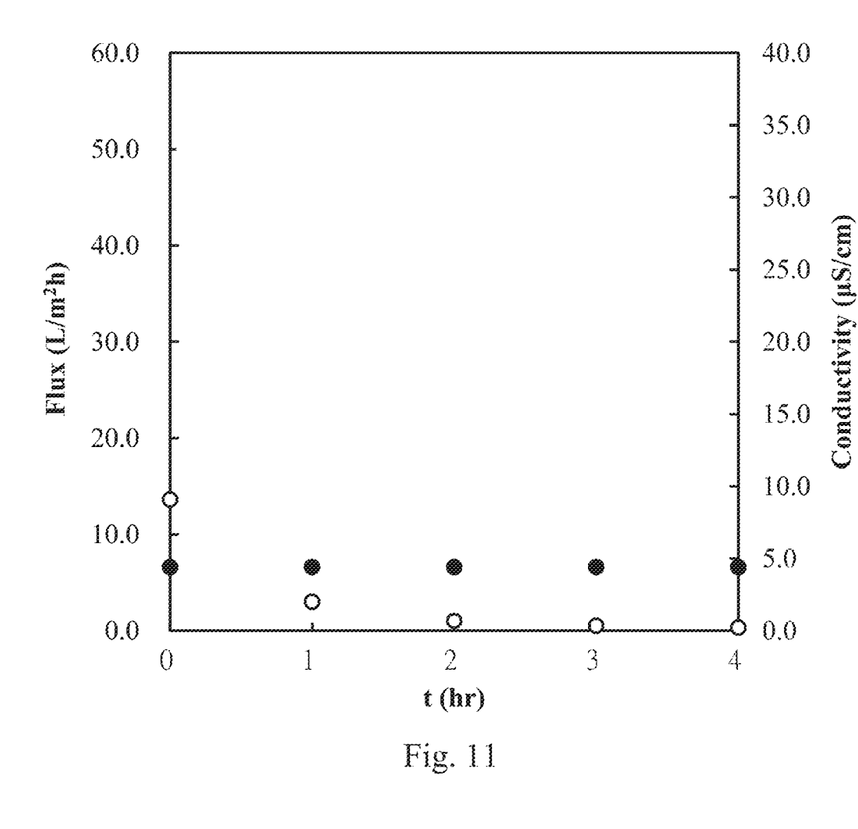

In FIG. 11, the hollow points represent membrane flux (corresponding to the ordinate at the left hand side), the solid points represent conductivity (corresponding to the ordinate at the right hand side). The wastewater at the hot end is added with Tween 20, and the concentration thereof is 300 mg/L. The temperature of the water at the cold end is about 21° C., the temperature of the wastewater at the hot end is about 60° C., the flow rate of the wastewater at the hot end is about 6 L/min, and the flow rate of the water at the cold end is about 1 L/min. The electrolyte added into the wastewater at the hot end is NaCl, and the initial conductivity of the wastewater is 1400 μS/cm. The composite membrane includes the hydrophobic porous membrane and the high water content hydrogel layer, in which the hydrophobic porous membrane is a PTFE film with a thickness of 20 μm and a pore size of 0.2 μm, and the high water content hydrogel layer is a HEMA layer of 22 wt % with a mesh size of 1.3 nm, a water content of 67%, and a thickness of 200 μm. According to the result shown in FIG. 8, after a period of operation time, the membrane flux and the conductivity at the cold end remain stable. Therefore, the composite membrane with the high water content hydrogel layer made of HEMA can be utilized for processing the wastewater containing Tween 20.

According to the membrane distillation result, after a long-term membrane distillation, the membrane flux and the conductivity of the Sample 1 and Sample 2 at the cold end remain stable. Therefore, the composite membrane of the present disclosure can be utilized for processing wastewater containing SDS.

After a really long-term membrane distillation, for example, a membrane distillation of at least more than 150 hours, a problem of flux reduction is raised. In order to solve the problem, the composite membrane can be washed to recover the membrane flux. The steps for washing the composite membrane includes keeping the composite membrane in the membrane distillation apparatus (e.g. the membrane distillation apparatus is not disassembled during the washing process), and forcing huge amount of clean water passing through the hot end for removing the particles adhered on the surface of the composite membrane facing the hot end. In some embodiments, during the fabrication of the composite membrane, the composite membrane are stored in a wet cold storage manner, such that the texture of the composite membrane can be more compact thereby providing better isolation function. In some embodiments, the composite membrane can be replaced after a really long-term membrane distillation.

The present disclosure provides a composite membrane. The composite membrane includes a hydrophobic porous membrane and a high water content hydrogel layer disposed on the surface of the hydrophobic porous membrane facing the hot end. The surface active agents contained in the wastewater at the hot end are blocked by the high water content hydrogel layer, thus the problem of pore wetting of the hydrophobic porous membrane can be prevented. Therefore, the membrane distillation technique can be utilized for processing wastewater containing surface active agents.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A composite membrane utilized in membrane distillation, comprising:
   a hydrophobic porous membrane having a first surface and a second surface opposite to each other, wherein the first surface is corresponding to a wastewater having surface active agents and the second surface is corresponding to a cold side; and
   a high water content hydrogel layer disposed at the first surface, wherein the high water content hydrogel layer comprises curdlen or agarose, a mesh size of the high water content hydrogel layer is in a range from about 192 nm to about 237 nm, a thickness of the high water content hydrogel layer is about 200 um, and a water content of the high water content hydrogel layer is from about 94% to about 96%, $$\text{wherein the water content} = \frac{W_s - W_d}{W_s} \times 100\%,$$

in which Ws represents a weight of the wet high water content hydrogel layer, and Wd represents a weight of the dry high water content hydrogel layer.

2. The composite membrane of claim 1, wherein the high water content hydrogel layer is a physical crosslinking material or a chemical cross linking material.

3. The composite membrane of claim 1, wherein the hydrophobic porous membrane is made of polytetrafluoroethylene (PTFE), polypropene (PP), polyvinylidene fluoride (PVDF), polyolefin, or the combinations thereof.

* * * * *